United States Patent [19]

Flood

[11] 4,333,579
[45] Jun. 8, 1982

[54] PANEL FILTER HOUSING

[75] Inventor: Lawrence C. Flood, Hamlin, N.Y.

[73] Assignee: Dollinger Corporation, Rochester, N.Y.

[21] Appl. No.: 185,372

[22] Filed: Sep. 8, 1980

[51] Int. Cl.³ .......................... B65D 6/26; B65D 6/34
[52] U.S. Cl. .................................. 220/4 R; 220/4 F; 220/72; 220/80
[58] Field of Search ................. 220/4 R, 4 C, 4 F, 80, 220/72, 83

[56] References Cited

U.S. PATENT DOCUMENTS

| | | | |
|---|---|---|---|
| 2,094,523 | 9/1937 | Bugbee | 220/4 C |
| 2,467,698 | 4/1949 | Reynolds | 220/4 R |
| 2,644,602 | 7/1953 | Ross | 220/8 |
| 3,044,656 | 7/1962 | Combs | 220/80 |
| 3,315,834 | 4/1967 | Vamlich | 220/4 R |
| 3,677,433 | 7/1972 | Collins | 220/80 |
| 3,687,168 | 8/1972 | Sherman | 220/80 |
| 4,002,261 | 1/1977 | Litchfield | 220/80 |

FOREIGN PATENT DOCUMENTS 553052  8/1974  Switzerland ..................... 220/4 C Primary Examiner—George E. Lowrance
Attorney, Agent, or Firm—Shlesinger, Fitzsimmons & Shlesinger

[57] ABSTRACT

This housing is made from four rectangular panels that are cut to desired lengths from an aluminum extrusion, and arranged in rectangularly spaced relation to define a large, rectangular opening. A rail extends along each longitudinal side edge of each panel and has therein a plurality of spaced, parallel, longitudinally extending recesses, which open at opposite ends on inclined, plane surfaces that are formed on opposite ends, respectively, of each panel. The inclined ends of the panels are secured together by four right angular corner clips at each end of the housing. The two legs of each clip project slidably and frictionally into a pair of registering openings formed in the two panels which form a given corner of the housing. A metal strap or handle extends transversely across one end of the opening in the housing and has rolled end edges which are slidably mounted in a pair of confronting, generally circular recesses that are formed in the side rails of the panel. The outer end surfaces of the rails have therein registering recesses which form a rectangular, outwardly facing channel at each end of the housing, and in which is seated a resilient gasket material which is used sealingly to connect opposite ends of the housing in a conduit or the like.

12 Claims, 4 Drawing Figures

PANEL FILTER HOUSING

This invention relates to filter housings, and more particularly to relatively large, panel-type filter housings which are generally rectangular in configuration.

Heretofore it has been customary to build panel-type filter housings from four, elongate, rectangular metal panels, the edges of which are secured together to form a relatively large, rectangular housing (e.g. several cubic feet) in the center of which is mounted a large, rectangular filter. Filters of this type are frequently used for removing dust particles and the like in large air return vents. Although most such prior filter housings have been relatively simple to assembly, they have nevertheless been rather expensive to manufacture, and extremely heavy and difficult to manipulate. Moreover, each such prior housing has required the use of numerous separate parts for securing the four basic panels together, and likewise has required numerous manual operations to complete an assembled housing.

It is an object of this invention, therefore, to provide an improved panel-type filter housing which is substantially more inexpensive to manufacture and easier to manipulate than prior such housings.

Another object of this invention is to provide an improved filter housing of the type described which requires substantially fewer parts than prior such housings, and which can be assembled more rapidly and with fewer manual operations.

A more specific object of this invention is to provide an improved, simplified filter housing of the type described which utilizes extruded aluminum panels or sections that can be cut to desired lengths and releasably attached to each other by means of tongue and groove connections, thereby eliminating drilling operations usually required when employing separate fastening means, such as conventional screws, bolts, and the like.

Still a further object of this invention is to provide a panel-type filter housing having an improved handle and means for attaching same to the housing.

Other objects of the invention will be apparent hereinafter from the specification and from the recital of the appended claims, particularly when read in conjunction with the accompanying drawings.

Figures 1, 2:
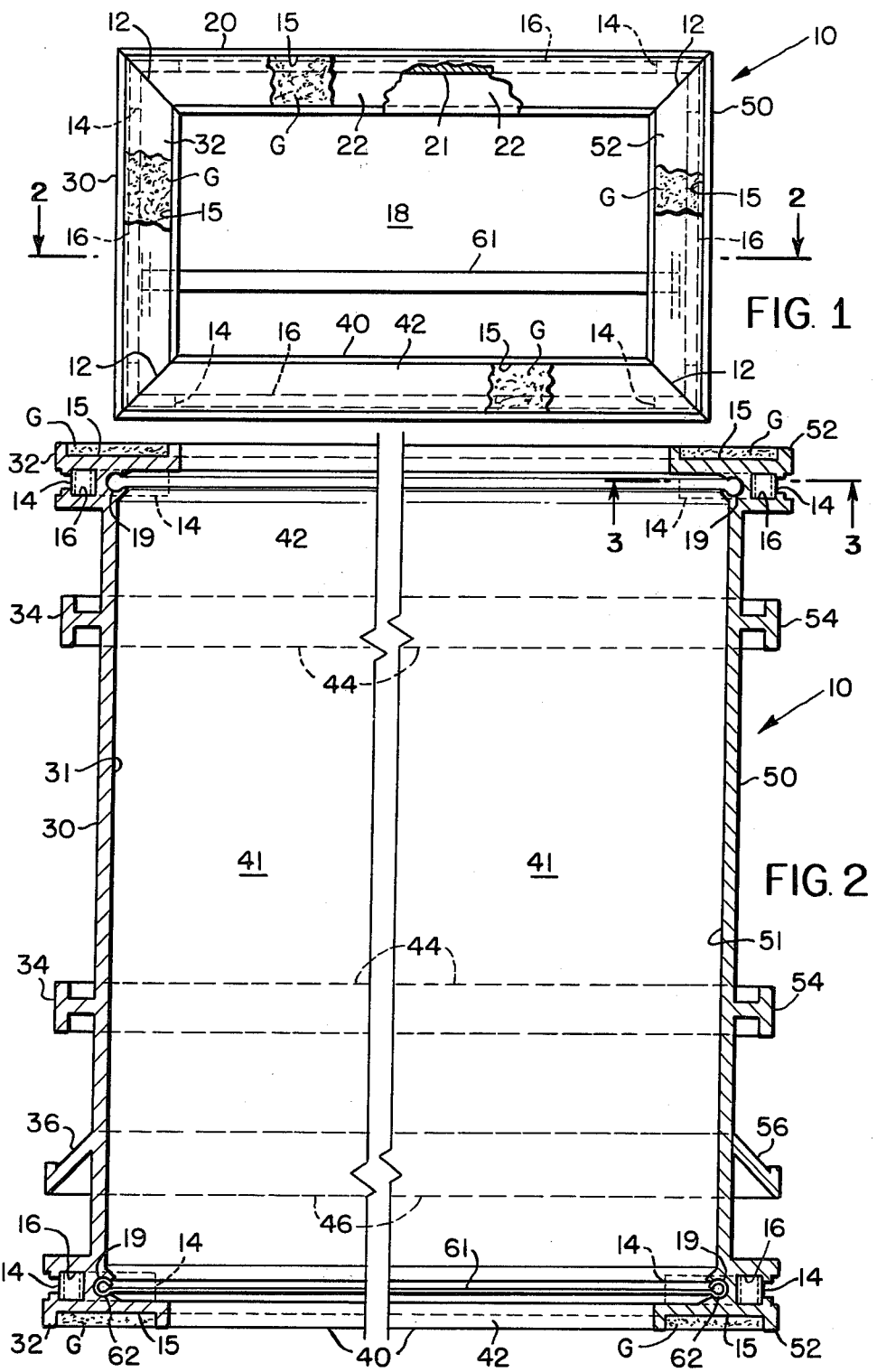
FIG. 1 is a front elevational view of a panel filter housing made according to one embodiment of this invention, portions of the housing and the gasket material employed therewith being cut away.
FIG. 2 is an enlarged, fragmentary sectional view taken generally along the line 2—2 in FIG. 1 looking in the direction of the arrows.

Referring now to the drawings by numerals of references, and first to FIGS. 1-3, 10 denotes generally a rectangular filter housing formed by four, elongate, rigid panels 20, 30, 40 and 50, each of which has formed on opposite ends thereof plane surfaces that are inclined at approximately 45° to the length of the panels. At each of the four corners of housing 10 the inclined ends of adjacent panels are secured together along seams 12, as noted in greater detail hereinafter, by means of a plurality (eight in embodiments illustrated) of identical, right-angular corner clips 14. When secured in this manner (FIG. 1) the four panels 20, 30, 40 and 50 are disposed in right angular relation to each other, and form a central opening 18 in the housing 10 for accommodating a conventional panel filter (not illustrated).

Figure 3:
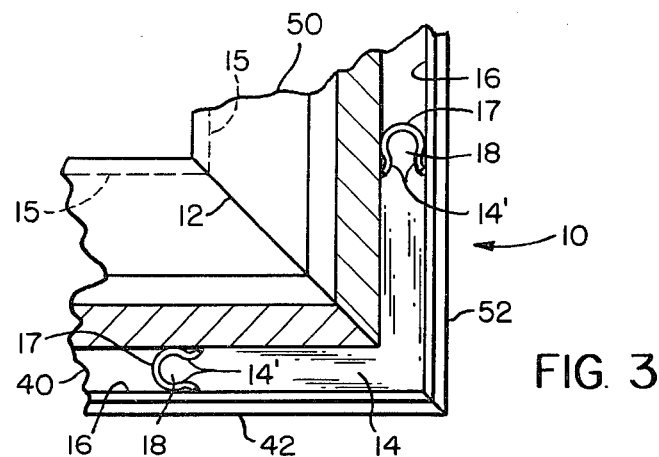
FIG. 3 is a greatly enlarged fragmentary sectional view taken generally along the line 3—3 in FIG. 2 looking in the direction of the arrows.

In the embodiment illustrated in FIGS. 1 to 3, each of the panels 20, 30, 40 and 50 is cut from an aluminum extrusion, and is therefore identical in width and in cross sectional configuration. The upper and lower panels 20 and 40 (FIG. 1), however, are cut so as to be slightly longer than the side panels 30 and 50, so that the resulting housing opening 18 is oblong in configuration rather than being perfectly square. Whether or not opening 18 is square or oblong, however, is obviously a matter of choice.

As shown perhaps more clearly in FIG. 2, the panels 20, 30, 40 and 50 have plane, generally smooth, internal surfaces 21, 31, 41, and 51, respectively, which are adapted to surround and engage the panel-shaped filter that is designed to be mounted in housing 10. The two longitudinal sides of each panel, 20, 30, 40 and 50 have formed thereon enlarged, longitudinally extending side rails 22, 32, 42, and 52, respectively, which surround the opening 18 at each end of the housing 10. Intermediate its side rails each panel has formed on its outer surface a pair of spaced, parallel reinforcing ribs, which in the case of the panels 30, 40, and 50 are denoted at 34, 44, and 54, respectively, (FIG. 1). Although not illustrated, it will be understood that similar reinforcing ribs are formed on the outer surface of panel 20 intermediate its side rails 22.

Also projecting from the outer surface of each panel 20, 30, 40 and 50 the same distance as the above-noted reinforcing ribs, and located between one of the side rails of a panel (the lower rail as shown in FIG. 2) and the adjacent reinforcing rib, is an integral, retaining lug, which in the case of panels 30, 40 and 50 are denoted at 36, 46, and 56, respectively. Again, as in the case of the reinforcing ribs, a similar such lug, although not illustrated, is formed on the panel 20 adjacent one of its side rails 22 so as to register with the lugs 36, 46 and 56.

As shown more clearly in FIGS. 1 and 2, each of the rail sections 22, 32, 42, and 52 has in its outer, end surface a shallow, longitudinally extending recess 15, which is generally rectangular in cross section, and the bottom of which constitutes a plane, flat surface disposed at right angles to the plane, inner surface 21, 31, 41 or 51, respectively, of an associated panel. At each end of the housing 10 the recesses 15 in the four panels communicate with each other to form around each end of the opening 18 a continuous, rectangular channel or recess in which strips of resilient gasket material G are secured to enable the housing 10 to be sealingly connected in a conduit or the like.

Inwardly of the associated gasket recess 15, each panel side rail 22, 32, 42 and 52 has in its outer, side surface (i.e., the surface opposite to its inner plane surface 21, 31, 41, or 51) a longitudinally extending groove or recess 16, which is rectangular in cross section so as to be able to accommodate one of the legs of a corner clip 14. At each end of housing 10 the recesses 16 in a set of registering side rails 22, 32, 42 and 52 form a continuous, rectangular channel around the opening 18, and within the associated end rails. As shown for example in FIG. 1, the channels 16 in the two side panels 30 and 50 communicate at their upper and lower ends, respectively, with the registering channels 16 formed in the upper and lower panels 20 and 40, respectively. Also, at each end of the housing 10, each of four corner clips 14 has its legs slidably positioned in a pair of intersecting recesses 16 in order releasably to secure together the adjacent corners of a pair of panels along one of the seams 12.

As shown more clearly in FIG. 3, opposite ends of each clip 14 are held snugly and frictionally in a pair of intersecting recesses 16 in adjacent panels by means of a pair of resilient, generally C-shaped spring members 17. Each member 17 is positioned over an arcuate head 18, which is formed on each end of each clip 14, so that the two legs of each spring member 17 engage in a pair of notches or recesses 14, which are formed in opposite sides of each leg of a clip 14 adjacent its outer end.

Each panel rail 22, 32, 42 and 52 also has formed in its inner surface a longitudinally extending recess 19 (FIG. 2 which is generally circular in cross sectional configuration. Each recess 19 is positioned behind and parallel to the adjacent recess 16. At one end of housing 10 (The lower end as illustrated in FIG. 2) a metal strap or handle 61 is releasably attached to housing 10 by means of rolled side edges 62, which are formed on opposite ends of the strap. The rolled edges 62 are just large enough to fit, and are slidably positioned in, the confronting recesses 19 formed on the inner surfaces of the rails 32 and 52 of the side panels 30 and 50, respectively. As will be apparent from an examination of FIGS. 1 and 2, the rolled edges 62 of strap 61 are adjustably slidable in the associated rail recesses 19, so that the handle (61) can be adjusted toward or away from the upper and lower panels 20 and 40, respectively.

The assembly of the housing 10 is a relatively simple matter. First, assuming that the four panels have been cut to the desired lengths from an extrusion, opposite ends 62 of the handle 61 are slidably inserted into the recesses 19 of the two panels end rails that are to be interconnected. Since the recesses 19 are formed into each of the two side rails of each panel, it is clear that strap 61 can be adjustably mounted in either end of the housing 10.

After the strap 61 has been mounted, the four panels 20, 30, 40 and 50 can be quickly and easily assembled together merely by slidably inserting one of the legs of each of two clips 14 (with the spring members 17 thereon into the upper ends of the recesses 16 in the panel 30, and one of the legs of each of two other clips 14 into the lower ends of the recesses. Similarly, four clips 14 (with members 17 thereon) can then be attached to the four corners of the side panel 50, after which the remaining eight legs of the clips 14 can be inserted into opposite ends of the registering recesses 16 in the upper and lower panels 20 and 40, respectively. Again, the two rounded ends of these last-inserted legs of clips 14 will have the spring members 17 positioned thereover, so that when inserted into an associated recess 16, the respective clip leg will have frictional, sliding engagement with the bore walls of the respective recess 16, thereby frictionally to secure the panels together along the seams 12.

The gasket material G can then be inserted into the recesses 15, after which the housing 10 can be connected in the conduit where it is to be used, for example by inserting two or more of the retaining lugs 26, 36, 46 and 56 over correspondingly shaped dentent means (not illustrated), for example, on the conduit to which the housing 10 is to be attached. Since the fixtures to which the retaining lugs are to be attached form no part of this invention, they have not been illustrated herein. It will be apparent, however, that the exact configuration of the retaining lugs may vary, depending upon the configuration of the retaining means which is to be used for securing the housing 10 in place, when in use.

Figure 4:
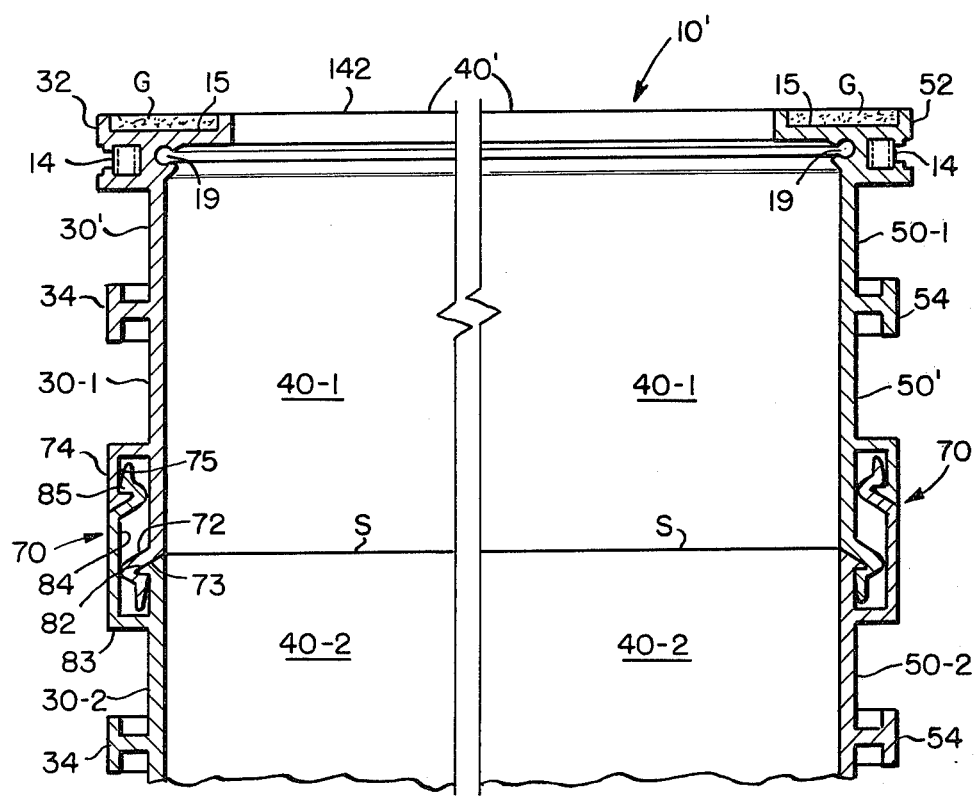
FIG. 4 is a fragmentary sectional view generally similar to that shown in FIG. 2, but illustrating a modified form of this housing.

From an examination of FIGS. 2 and 4, it will be noted that all of the illustrated panels, or panel sections, are formed with a plurality of longitudinally extending recesses or grooves of various cross sectional configurations but all of which open in some way on the exterior of the panel or section, and in no case form a completely closed aperture or channel. Note for example, that although the recess 16 in each panel is almost closed, or almost forms a rectangular bore along each side of a panel, it nevertheless opens on the exterior of the panel so that the panel can be formed as a continuous extrusion. However, by properly configuring the cross section of recesses such as those denoted at 16 and 19, it is possible to utilize the recesses for various functions—i.e., as part of the means for securing the respective panels together (16), or as part of the means for releasably securing a handle to the housing (19).

From the foregoing it will be apparent that the present invention provides a relatively simple and inexpensive means for quickly and releasably attaching together four, substantially identical panels to form the housing 10 Since each panel is cut from an identical extrusion, the size of the respective housing can be varied, at least with respect to its cross sectional area, merely by cutting the respective panels to the desired lengths, with opposite ends of each panel, of course, being cut on a bias or plane, for example at 45° to the longitudinal axis of the respective panel. When properly cut in this manner, the clip channels or recesses 16 will properly register one with the other when the panels are assembled, thereby to form a rectangular channel or recess completely around the opening formed at each end of the housing by the panel rails. By using the relatively inexpensive corner clips, it is possible to eliminate the need for drilling various holes in the respective panels in order to accommodate, as was heretofore the practice, conventional screws, bolts, and the like for securing various plates together to form the housing 10.

Moreover, by employing aluminum extrusions, the overall weight of the housing 10 can be reduced, and yet still maintain the required strength through the use of spaced reinforcing ribs 24, 34, etc. Furthermore, by providing circular recesses 19 in each of the end rails of each panel, it is possible to use an extremely simple and inexpensive handle, comprising nothing more than a metal strap having opposite ends rolled upon themselves to form the arcuate ribs 62, which are slidably adjustable in the recesses 19.

In the embodiment thus far described, the size of housing 10, at least as far as its overall cross sectional area is concerned, can be readily selected merely by cutting the respective panels to their desired lengths. The modified panels and housing 10' shown in FIG. 4, wherein like numerals are employed to denote elements similar to those employed in the first embodiment, permit ready selection not only of the cross sectional area of the filter housing, but also permit, or simplify, the manufacture of housings of different lengths, without necessarily changing the width of the respective panels each time it is desired to change the length of the housing.

For example, as shown in FIG. 2, each panel 20, 30, 40 and 50 has the same, fixed width, each being cut from the same extrusion, and each having opposed, similarly shaped side rails 22, 32, 42, or 52. In the embodiment shown in FIG. 4, however, each of the modified panels, only three of which are shown at 30', 40', and 50', comprises two, separate sections 30-1, 30-2, 40-1, 40-2; and 50-1, 50-2, respectively. The upper panel sections 30-1, 40-1 and 50-1, as shown in FIG. 4, are releasably coupled along a seam S to the lower sections 30-2, 40-2, and 50-2 by means of releasable coupling elements denoted generally at 70 in FIG. 4. Since the coupling elements for the upper panel sections are similar to each other, while corresponding element for the lower panel sections are likewise similar each to the other, only one set 70 of coupling elements will be described in detail herein. Moreover, since the outer edges of each of these modified panel sections (the edges thereof remote from seam S) are similar to those as described in the previous embodiment (i.e., each having an enlarged side rail 22, 32, 42, or 52, respectively, only the upper portion of housing 10' has been shown in FIG. 4. Referring now to the coupling 70 as shown in the left side of FIG. 4, the inner or lower marginal edge of panel section 30-1 has formed thereon a laterally projecting, hook-shaped rib 72 that extends the width of the panel section, and which has formed on its inside surface an elongate notch or latching recess 73 that faces the interior of the housing 10'. Spaced slightly inwardly of rib 72 (or above as shown in FIG. 4) panel section 30-1 has thereon a further, laterally projecting, hook-shaped rib 74 that extends the full width of the panel section parallel to rib 72, and which also has in its inside surface a longitudinally extending notch or latching recess 75 which also faces the interior of the housing.

On its inner edge (or upper edge as shown in FIG. 4) the lower panel section 30-2 has formed thereon an elongate, laterally projecting rib or hook 82 which is releasably and slidably seated in the latching recess 73 formed in the inner surface of the hook-shaped rib 72 on the upper panel section 30-1. Rearwardly or below rib 82 the panel section 30-2 has formed thereon an elongate, laterally projecting rib 83, which extends outwardly a distance greater than the outer surface of the rib 72 on the upper panel section, and which has in its inside surface a first, inwardly facing recess 84 into which rib 72 projects. Adjacent its upper end rib 83 has therein an outwardly facing recess which defines on rib 83 a hook-shaped projection 85, which engages slidably in the latching recess 75 formed in the rib 74 on upper section 30-1.

As can be seen from FIG. 4, therefore, each of the upper panel sections has thereon, in essence, a pair of spaced, parallel, inwardly facing latching recesses or surfaces, which are slidably coupled to a pair of spaced, parallel, outwardly facing hooks or projections formed on each of the lower sections of the panel. Thus the two sections of each panel can be releasably coupled together merely by sliding one pair of latching surfaces on one section into engagement with the pair of hook-shaped projections on the other section of the panel. The advantage of this construction is that one section of each panel, for example the upper section as shown in FIG. 4, can be stocked in a single size width while the lower sections can be made in different widths, so that the overall length of a housing can be selected by connecting to one of the upper sections, a lower section of the desired width.

Obviously even more versatility could be achieved by employing a panel made in three sections, the upper and lower sections of which would be similar to those shown in FIG. 4, and the intervening or middle section of which would have on one end (for example its upper end) coupling elements similar to those denoted at 82-85, and the lower end of which would have thereon coupling elements similar to those denoted at 72-75. The intervening or middle sections could then be made and stocked in many different widths, thereby further simplifying the construction of filter housings of selectively different lengths.

While this invention has been described in detail in connection with only certain embodiments thereof, it will be apparent that it is capable of still further modification, and that this application is intended to cover any such modifications as may fall within the scope of one skilled in the art, or the appended claims.

What I claim is:

1. A filter housing, comprising
two pairs of rigid panels, each having a generally rectangular configuration overall, and each being substantially identical in cross sectional configuration,
a pair of spaced, parallel, similarly-shaped side rails formed along the two side edges, respectively, of each of said panels, and a plane, filter-supporting surface formed on one side of each panel and extending between the two side rails thereof, and
means releasably securing opposite ends of one of said pairs of panels to opposite ends of the other pair of panels, thereby to form a generally rectangular filter housing having therethrough a central opening bound by said plane surfaces on said panels,
each of said side rails having therein a plurality of spaced, parallel, longitudinally extending recesses, one of which opens at each end thereof on a corner of said rectangular housing in registry with one end of said one recess in another of said rails, and
said securing means comprising a plurality of right-angular clip members located at the corners of said housing, and each clip member having opposite ends thereof frictionally engaged in a pair of said registering ends of said one recesses.

2. A filter housing as defined in claim 1, including a resilient, generally C-shaped spring member positioned over each end of said clip members, and having the ends thereof seated in a pair of opposed recesses formed in opposite sides of each leg of a clip member adjacent the terminal end thereof.

3. A filter housing as defined in claim 1, wherein
a second recess in each of said rails opens on said one side of each panel, and
a handle extends transversely across said opening in said housing adjacent one end thereof, and has opposite ends thereof slidably secured in a pair of second recesses to permit adjustment of said handle on the housing.

4. A filter housing as defined in claim 3, wherein
said second recess is nearly circular in cross section and opens through a narrow slot to the exterior of the associated rail, and
said handle comprises a metal strap opposite ends of which have rolled edges which are slidably guided in a confronting pair of said second recesses.

5. A filter housing as defined in claim 3, wherein
a third recess in each of said rails faces outwardly of said housing and has a plane bottom surface lying in a plane extending at right angles to said plane, filter-supporting surface on the associated panel, and a layer of gasket material is secured in each of said third recesses.

6. A filter housing as defined in claim 1, wherein each of said panels is made in a plurality of sections,
  each of said panel sections has one of said rails extending along one longitudinal side edge thereof, and has a plurality of spaced coupling ribs extending along the other edge thereof parallel to said one side rail, and
  the spaced coupling ribs on one section of a panel are releasably engageable with the coupling ribs on another section of said panel releasably to couple to two last-named panel sections together to form one of said panels.

7. A filter housing as defined in claim 1, wherein
  each of said panels is cut from an identical aluminum extrusion, and
  each of said panels has thereon on the side thereof opposite to said plane surface a plurality of spaced, parallel reinforcing ribs.

8. A filter housing as defined in claim 7, wherein opposite ends of each panel are cut on planes, which are inclined to the direction of the length of the panel, and which are complimentary to the angle of inclination of the ends of the two other panels to which the panel is secured.

9. A filter housing having therethrough a central opening defined by a plurality of rigid panels which are secured end to end around said opening, each of said panels being identical in cross sectional configuration and comprising
  a rigid, generally rectangularly-spaced plate having a pair of spaced, parallel, similarly-shaped side rails integral with and extending along each of the opposed sides edges of the plates, and located at opposite ends, respectively, of said central opening,
  said plate having on one side thereof a plane, flat surface facing said central opening and extending between said side rails, and having on the opposite side thereof at least one reinforcing rib projecting from its surface in spaced, parallel relation to said side rails, and
  each of said side rails having therein a plurality of spaced, parallel, longitudinally extending recesses, one of which opens at said one side of said plate and is generally circular in cross section, and the other of which opens on the opposite side of said plate and is generally rectangular in cross section.

10. A filter housing as defined in claim 9, wherein a third recess is formed in each of said rails in the outer end surface thereof, and has a plane, flat bottom surface which extends at right angles to said plane surface formed on said one side of the associated plate between said side rails thereof.

11. A filter housing as defined in claim 10, wherein the side rails one said plates are equi-spaced from each other and are secured end to end to one to another at each end of said central opening by a plurality clip members, each of which projects slidably and frictionally at opposite ends thereof into a pair of said other recesses in adjacent ends, respectively, of a pair of said side rails.

12. A filter housing as defined in claim 11, wherein
  at each end of said central opening said one recess in each side rail is disposed in spaced, parallel, confronting relation to a like recess in another of said rails, and a metal strap extends transversely across said central opening at one end thereof, and has enlarged, beaded edges on opposite ends thereof slidably secured in a pair of said confronting recesses to provide an adjustable handle for manipulating said housing.

* * * * *